United States Patent
Butovsky et al.

(10) Patent No.: US 11,481,508 B2
(45) Date of Patent: Oct. 25, 2022

(54) DATA ACCESS MONITORING AND CONTROL

(71) Applicant: International Business Machines Corporation, Armonk, NY (US)

(72) Inventors: Tania Butovsky, Needham, MA (US); Leonid Rodniansky, Allston, MA (US); Mikhail Shpak, New York, NY (US); Richard Ory Jerrell, Manchester, NH (US); Peter Maniatis, Clinton, MA (US); Shidong Shan, Shirley, MA (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 17/121,975

(22) Filed: Dec. 15, 2020

(65) Prior Publication Data
US 2022/0188437 A1 Jun. 16, 2022

(51) Int. Cl.
*G06F 21/62* (2013.01)
*G06F 21/55* (2013.01)

(52) U.S. Cl.
CPC ........ *G06F 21/6218* (2013.01); *G06F 21/554* (2013.01); *G06F 2221/034* (2013.01)

(58) Field of Classification Search
CPC .............. G06F 21/6218; G06F 21/554; G06F 2221/034; G06F 21/577; G06F 21/6245; H04L 63/0428
See application file for complete search history.

(56) References Cited

U.S. PATENT DOCUMENTS

| | | | |
|---|---|---|---|
| 8,590,034 B2 | 11/2013 | Hussain et al. | |
| 8,762,406 B2 | 6/2014 | Ho et al. | |
| 8,826,370 B2 | 9/2014 | Boukbza | |
| 8,930,381 B2 | 1/2015 | Raghunnathan et al. | |
| 8,930,382 B2 | 1/2015 | Branish, II et al. | |

(Continued)

FOREIGN PATENT DOCUMENTS

WO WO 2015/076846 A1 * 5/2015 ............... H04L 9/32

OTHER PUBLICATIONS

Combined Search and Examination Report under Sections 17 and 18(3) dated Jul. 7, 2022 for Application No. GB2117264.8, 15 pages.

*Primary Examiner* — Christopher A Revak
(74) *Attorney, Agent, or Firm* — Stephen J. Walder, Jr.; Jorge Maranto (57) ABSTRACT

A mechanism is provided for monitoring and controlling data access. Responsive to intercepting a response from a server to a request for information from a client device, a security system agent applies pattern matching using a predefined set of sensitive data pattern rules to identify at least one sensitive data access included in the response. Responsive to identifying at least one sensitive data access matching one or more of the predefined set of sensitive data pattern rules, the security system agent modifies that the request from the client by marking the at least one sensitive data access as sensitive thereby forming a modified request. The security system agent sends the modified request to the security system thereby causing the security system to process the modified request without access the sensitive data associated with the at least one marked sensitive data access.

14 Claims, 7 Drawing Sheets

(56) References Cited

U.S. PATENT DOCUMENTS

| | | |
|---|---|---|
| 10,097,582 B2 | 10/2018 | Rodniansky |
| 10,362,060 B2 * | 7/2019 | Basson ............... H04L 63/0428 |
| 10,447,663 B2 | 10/2019 | Sun et al. |
| 10,803,197 B1 * | 10/2020 | Liao ...................... G06F 21/604 |
| 2009/0300002 A1 * | 12/2009 | Thomas .............. G06F 16/2457 |
| | | 707/999.005 |
| 2014/0012833 A1 | 1/2014 | Humprecht |
| 2017/0011232 A1 | 1/2017 | Xue et al. |
| 2018/0020001 A1 | 1/2018 | White et al. |
| 2018/0232536 A1 * | 8/2018 | Fineman ............. G06F 21/6254 |
| 2020/0293683 A1 | 9/2020 | Scuderi et al. |
| 2021/0382949 A1 * | 12/2021 | Yastrebenetsky ..... G06F 21/577 |

* cited by examiner

DATA ACCESS MONITORING AND CONTROL

BACKGROUND

The present application relates generally to an improved data processing apparatus and method and more specifically to mechanisms for monitoring and controlling data access.

Security analytics is the process of using data collection, aggregation, and analysis tools for security monitoring and threat detection. Depending on the types of tools installed, security analytics solutions may incorporate large and diverse data sets into their detection algorithms. Security analytics data can be collected in several ways, including from:
 Network traffic
 Endpoint and user behavior data
 Cloud resources
 Business applications
 Non-IT contextual data
 Identity and access management data
 External threat intelligence sources Recent technological advancements in security analytics include adaptive learning systems that fine tune detection models based on experience and learnings, as well as anomaly detection logic. These technologies accumulate and analyze real-time data that includes:
 Asset metadata
 Geo-location
 Threat intelligence
 IP context These forms of data may then be used for both immediate threat response and investigations.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for monitoring and controlling data access. The illustrative embodiment applies, by a security system agent installed in a server separate from a security system, pattern matching using a predefined set of sensitive data pattern rules to identify at least one sensitive data access included in the response in response to intercepting a response from a server to a request for information from a client device. The illustrative embodiment determines, by the security system agent, whether the at least one sensitive data access matches one or more of the predefined set of sensitive data pattern rules. The illustrative embodiment modifies, by the security system agent, the request from the client by marking the at least one sensitive data access as sensitive thereby forming a modified request in response to the at least one sensitive data access matching one or more of the predefined set of sensitive data pattern rules. The illustrative embodiment sends, by the security system agent, the modified request with the at least one marked sensitive data access to the security system thereby causing the security system to process the modified request without access the sensitive data associated with the at least one marked sensitive data access due to the at least one marked sensitive data access in the modified request.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Security analytics is the process of using data collection, aggregation, and analysis tools for security monitoring and threat detection. Security systems performing data analysis on a transport level may intercept the network packets that are transferred between two instances. This interaction happens between instances, such as a client and a server. Encryption algorithms cause information transferred between these two instances to be unreadable, unless the encryption keys are compromised or if the encryption type is outdated or flawed. However, when confidential information is sent over network to be processed and stored by a monitoring security system, such confidential information may be at risk at the security system. Thus, the illustrative embodiments provides mechanisms that implement an identification of sensitive via a security system agent before sending data for processing to the security system (appliance). The security system agent is installed on a server monitored by the security system, for example a database server, service platform, or the like.

Currently, when a client sends a request/query to the server for processing, the request may access data that is sensitive, such as social security numbers, credit cards, patient records, geolocation coordinates, or the like, which is retrieved by the server. Current security system agents intercept the response to the client, which includes the original request and the retrieved data, and sends the original request and retrieved data over a network to the security system for processing. Existing methods of processing security policies related to the accessed data is implemented in the security system. However, such sensitive data is not relevant for processing by security system and thus, the mechanisms of the illustrative embodiments generate an additional security layer that ensures that a risk of the sensitive data being compromised or seen by someone without appropriate privileges is reduced. That is, the illustrative embodiments provide mechanisms that identify access to sensitive data at the server prior to being sent to the security system. In one embodiment, the access to the sensitive data is identified by the security system agent in the original request and no sensitive data is transmitted to the security system. Additionally, the security system uses the identification of access to the sensitive data that is identified in the response to detect data access violations. In one embodiment, a machine learning model may be used to identify objects in the modified request that is sent to the security system as "security important" and thus, be added to a list of sensitive objects.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
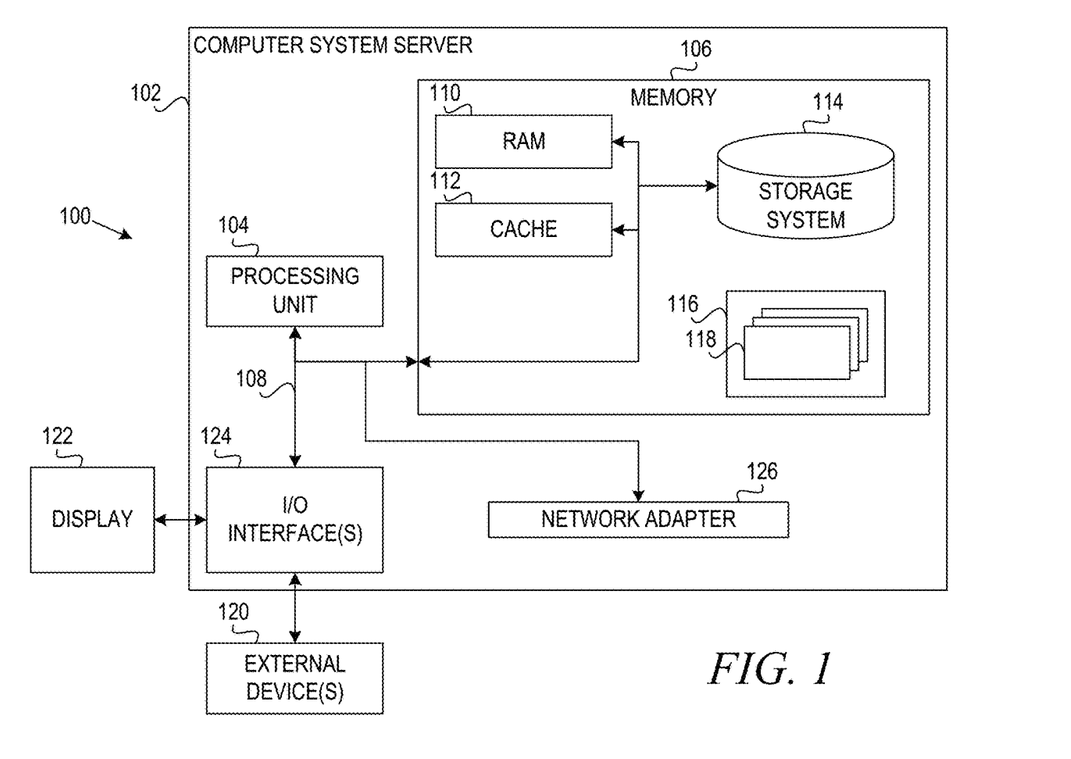
FIG. 1 depicts a cloud computing node according to an embodiment of the present invention.
Figure 2:
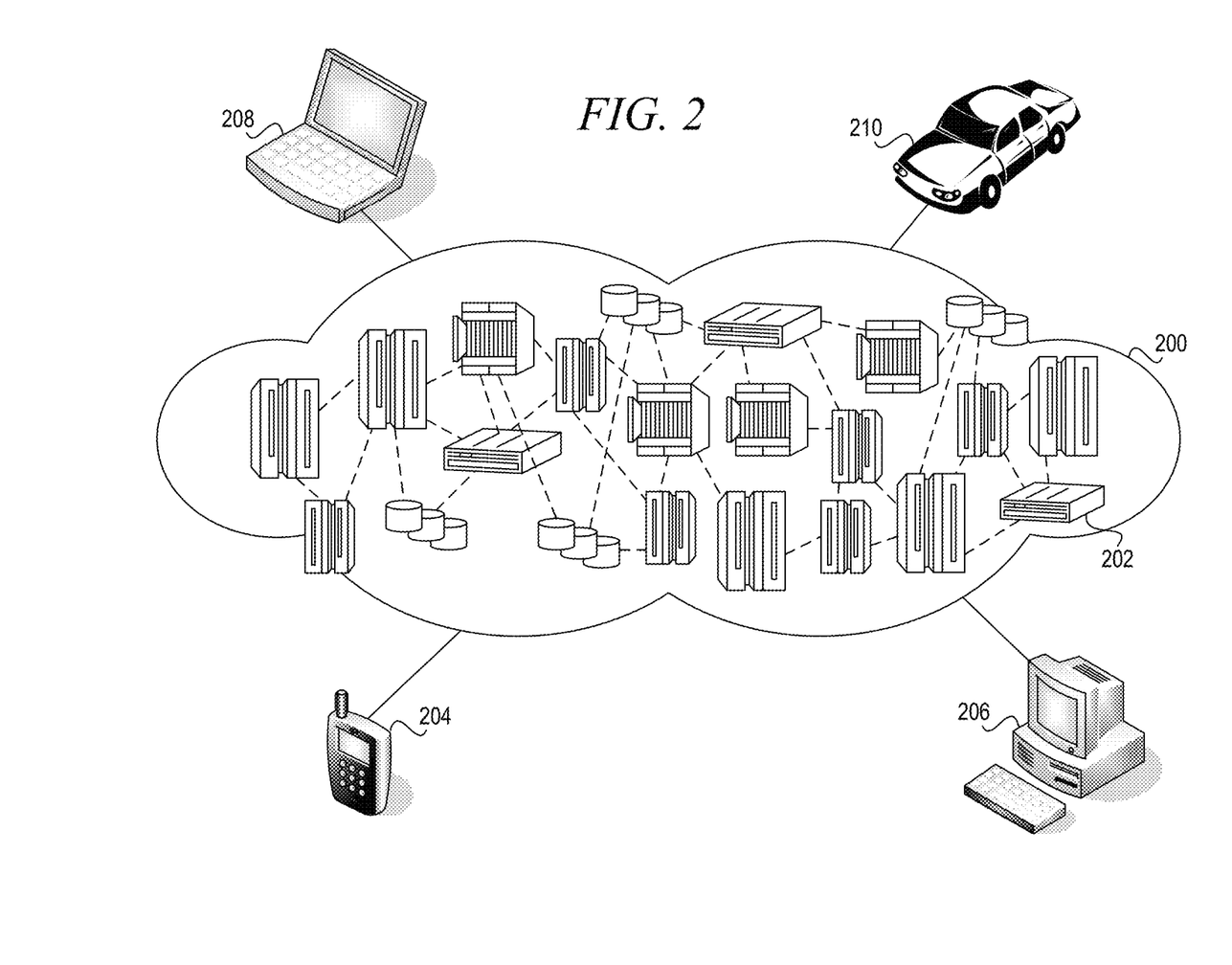
FIG. 2 depicts a cloud computing environment according to an embodiment of the present invention.
Figure 3:
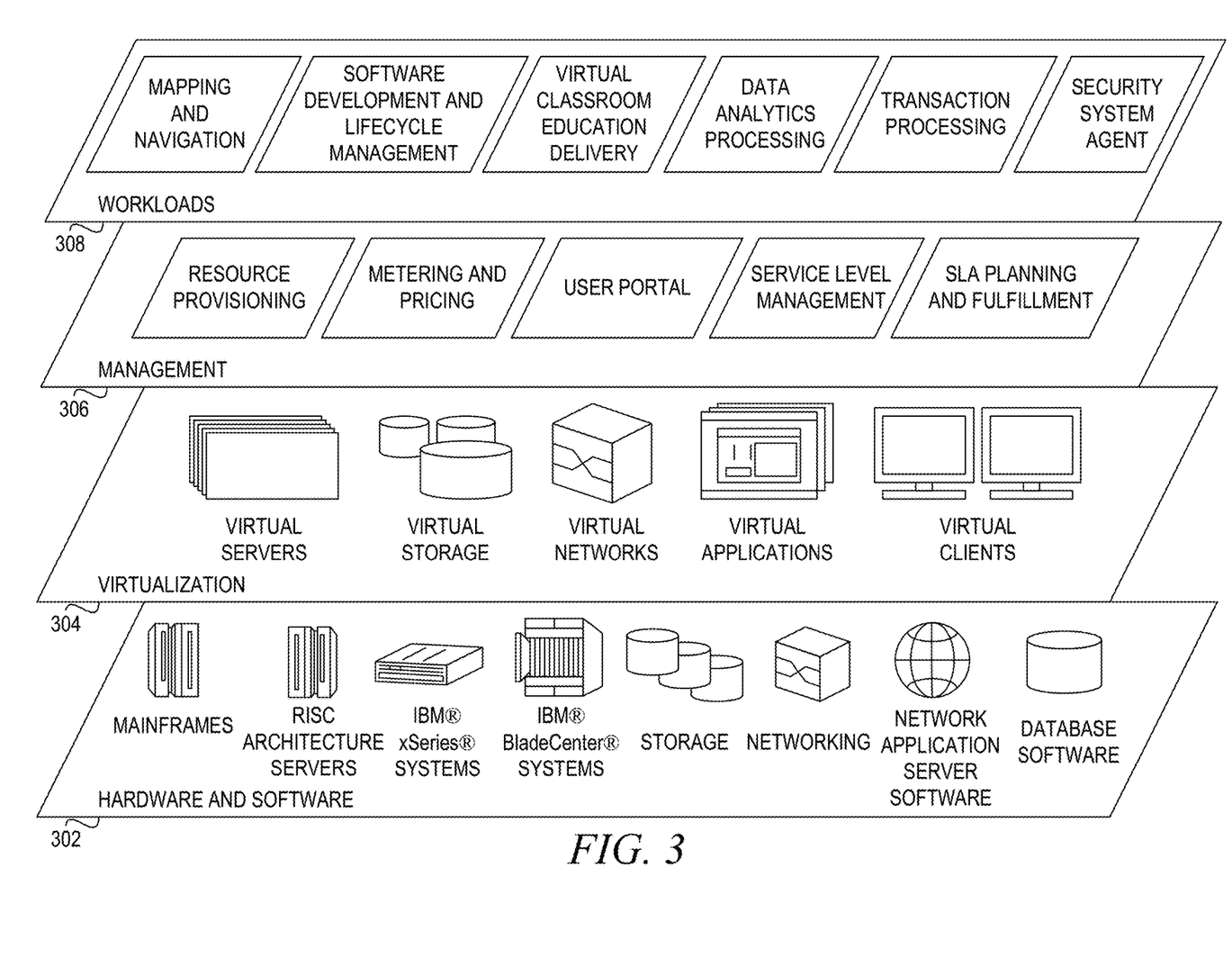
FIG. 3 depicts abstraction model layers according to an embodiment of the present invention.

Thus, the illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 100 there is a computer system/server 102, which is operational with numerous other general purpose or special purpose computing system environments or configurations. Examples of well-known computing systems, environments, and/or configurations that may be suitable for use with computer system/server 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 102 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 102 in cloud computing node 100 is shown in the form of a general-purpose computing device. The components of computer system/server 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 102 typically includes a variety of computer system readable media. Such media may be any available media that is accessible by computer system/server 102, and it includes both volatile and non-volatile media, removable and non-removable media.

System memory 106 can include computer system readable media in the form of volatile memory, such as random access memory (RAM) 110 and/or cache memory 112. Computer system/server 102 may further include other removable/non-removable, volatile/non-volatile computer system storage media. By way of example only, storage system 114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 108 by one or more data media interfaces. As will be further depicted and described below, memory 106 may include at least one program product having a set (e.g., at least one) of program modules that are configured to carry out the functions of embodiments of the invention.

Program/utility 116, having a set (at least one) of program modules 118, may be stored in memory 106 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 102 may also communicate with one or more external devices 120 such as a keyboard, a pointing device, a display 122, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 124. Still yet, computer system/server 102 can communicate with one or more networks such as a local area network (LAN), a general wide area network (WAN), and/or a public network (e.g., the Internet) via network adapter 126. As depicted, network adapter 126 communicates with the other components of computer system/server 102 via bus 108. It should be understood that although not shown, other hardware and/or software components could be used in conjunction with computer system/server 102. Examples, include, but are not limited to: microcode, device drivers, redundant processing units, external disk drive arrays, RAID systems, tape drives, and data archival storage systems, etc.

Referring now to FIG. 2, illustrative cloud computing environment 200 is depicted. As shown, cloud computing environment 200 comprises one or more cloud computing nodes 202 with which local computing devices used by cloud consumers, such as, for example, personal digital assistant (PDA) or cellular telephone 204, desktop computer 206, laptop computer 208, and/or automobile computer system 210 may communicate. Cloud computing nodes 202 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 204-210 shown in FIG. 2 are intended to be illustrative only and that computing nodes 202 and cloud computing environment 200 can communicate with any type of computerized device over any type of network and/or network addressable connection (e.g., using a web browser).

Referring now to FIG. 3, a set of functional abstraction layers provided by a cloud computing environment, such as cloud computing environment 200 of FIG. 2, is shown. It should be understood in advance that the components, layers, and functions shown in FIG. 3 are intended to be illustrative only and embodiments of the invention are not limited thereto. As depicted, the following layers and corresponding functions are provided:

Hardware and software layer 302 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 304 provides an abstraction layer from which the following examples of virtual entities may be provided: virtual servers; virtual storage; virtual networks, including virtual private networks; virtual applications and operating systems; and virtual clients.

In one example, management layer 306 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 308 provides examples of functionality for which the cloud computing environment may be utilized. Examples of workloads and functions which may be provided from this layer include: mapping and navigation; software development and lifecycle management; virtual classroom education delivery; data analytics processing; transaction processing; and security system agent. In accordance with the illustrative embodiments, the security system agent, which may be implemented in the depicted cloud computing environment or within any other type of computing environment now known or later developed, monitors accesses to highly sensitive information. That is, a client provides a predefined set of sensitive data pattern rules to a security system. At startup, the security system determines whether a security system agent exists on a database server, service platform, or the like, hereinafter referred to as simply a server, accessed by the client. If so, the security system sends the predefined set of sensitive data pattern rules to the security system agent on the server.

Subsequently, when the client sends a request for information, which may comprise multiple different accesses, which is received by the server, the server retrieves the data associated with each access and generates a response that includes each access and retrieved data associated with each access, where the retrieved data associated with a particular access may be one of a sensitive or non-sensitive nature. Before the response is returned to the client, a security system agent, operating on the server, intercepts the response and applies pattern matching using the predefined set of sensitive data pattern rules to identify any sensitive data included in the response that matches the predefined set of sensitive data pattern rules, such as credit card numbers, social security numbers, passwords, patient records, geolocation coordinates, or the like. In accordance with the illustrative embodiments, the security system agent is installed in the server's operating system kernel. In applying the pattern matching, the security system agent modifies the original request from the client before the original request is forwarded to the security system in which, if the security system agent identifies any sensitive data that matches one or more of the predefined set of sensitive data pattern rules, the security system agent marks the access that accessed the sensitive data in the original request as sensitive. The security system agent then allows the original response, including each access and retrieved data associated with each access, generated by the server to be returned to the client and forwards the modified request to the security system with the marked accesses associated with accesses to sensitive data and unmarked accesses associated with accesses to non-sensitive data. Therefore, in accordance with the illustrative embodiments, the security system agent identifies accesses to sensitive data and marks the access in the modified request as having accessed sensitive information.

Upon the security system receiving the modified request sent by the security system agent, the security system recognizes the modified request as security important, due to the marked access identification. The security system then processes the modified request without access to any sensitive data. That is, the security system parses the objects in each access using a filter that identifies markings from the security system agent and processes each access. Further, with regard to any marked objects, the security system parses any object associated with an access that has been marked by the security system agent as being an access to sensitive data. The security system extracts the object and adds the object to a list of sensitive objects as an object that comprises sensitive data.

While in this example the addition of the object to the list of sensitive objects is straight forward, not all objects identified as sensitive are immediately added to the list of sensitive objects. That is, taking the previous example a step further, two additional requests are received, the first request having an combined set of objects that includes an first object that has already been marked sensitive and a second object that is marked sensitive because it is combined with the first object and the second request having an object that matches the second object of the first request, which is not marked sensitive by the security system agent. However, in the first request of the two additional requests, the second object is only identified as sensitive simply because the second object is joined with the first object that was known to be sensitive, which creates a false positive on a non-sensitive object. Through, for example, machine learning techniques, rules engine applications, or the like, the security system identifies request objects that are false positives, such as the second object since in the second of the two additional requests because the second object was not marked by the security system agent as being sensitive. Thus, the security system would filter out such objects that are falsely identified as being of a sensitive nature simply because the objects are joined to another object identified as sensitive. After the security system filters out any "false positives", any remaining security important objects not already in the list of sensitive objects are added to the list of sensitive objects, which are subsequently used by the security system as criteria for implementing one or more security policies.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system, other than the SMP system mentioned previously, without departing from the spirit and scope of the present invention.

Figure 4:
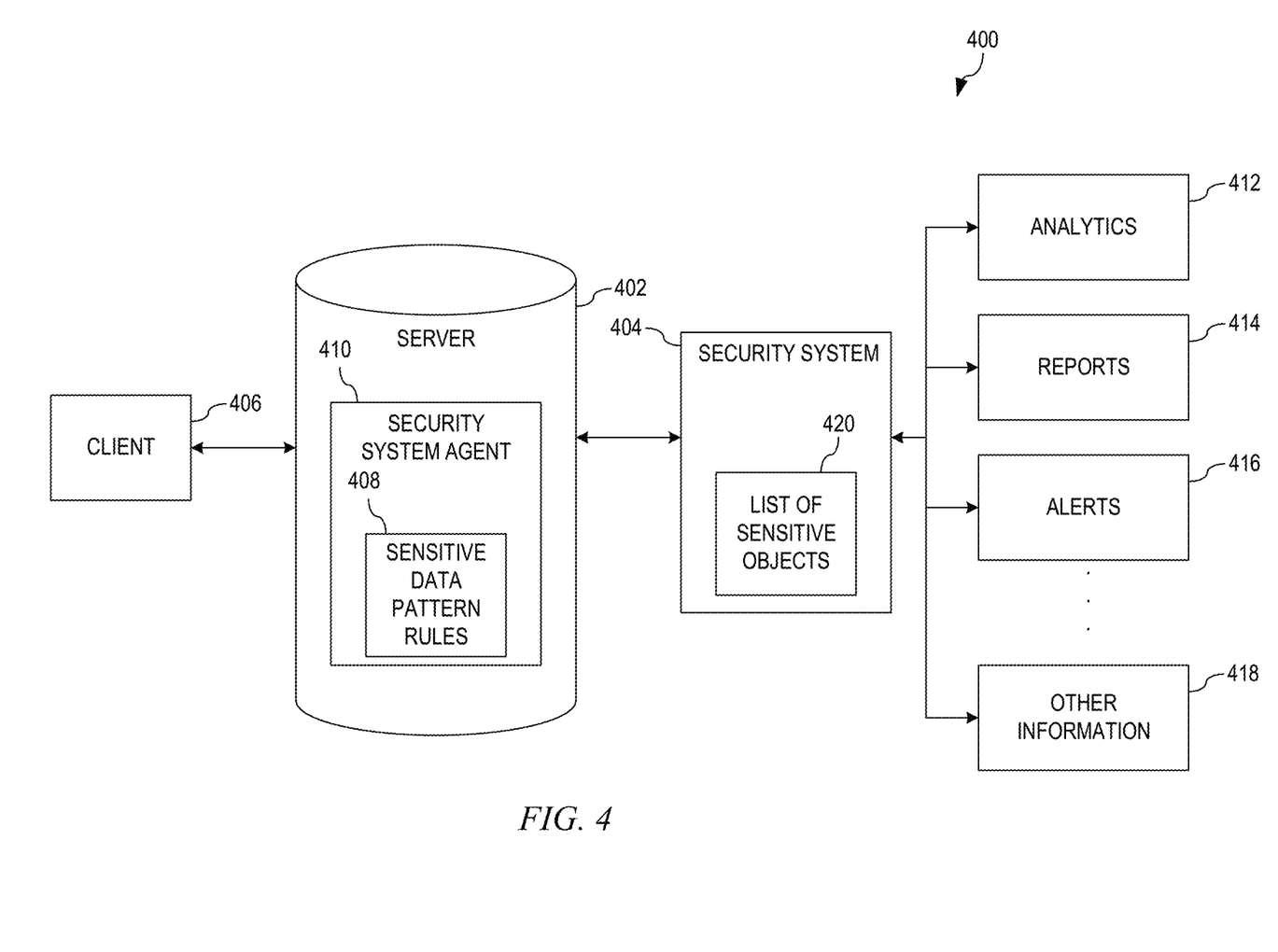
FIG. 4 depicts one example of functional block diagram of a data access and monitoring and control mechanism in accordance with an illustrative embodiment.

FIG. 4 depicts one example of functional block diagram of a data access and monitoring and control mechanism in accordance with an illustrative embodiment. Data processing system 400 comprises server 402 that accesses security system 404 in order to obtain information in the form of analytics, reports, alerts, or the like. As stated previously server 402 and security system 404 may be implemented in a cloud computing environment, such as cloud computing environment 200 of FIG. 2, or within any other type of computing environment now known or later developed. Initially client 406 sets up an account with security system 404, which includes client 406 providing a predefined set of sensitive data pattern rules 408 to a security system 404. Then at system startup, security mechanism 404 determines whether security system agent 410 exists on server 402. If so, security system 404 sends the predefined set of sensitive data pattern rules 408 to the security system agent 410 on the server 402.

Subsequently, when client 406 sends a request for information to server 402, which may comprise multiple different accesses, server 402 retrieves the data associated with each access and generates a response that includes each access and retrieved data associated with each access, where the retrieved data associated with a particular access may be one of a sensitive or non-sensitive nature. Before the response generated by server 402 is returned to client 406, security system agent 410 applies pattern matching using the predefined set of sensitive data pattern rules 408 to identify any sensitive data included in the response that matches the predefined set of sensitive data pattern rules 408, such as credit card numbers, social security numbers, passwords, patient records, geolocation coordinates, or the like. In applying the pattern matching, security system agent 410 modifies the original request from client 406 before the original request is sent to security system 404 in which, if security system agent 410 identifies any access to sensitive data that matches one or more of the predefined set of sensitive data pattern rules 408, security system agent 410 marks the access that accessed the sensitive data in the original request as sensitive. Security system agent 410 then allows the original response, including each access and retrieved data associated with each access, generated by server 402 to be returned to client 406 and forwards the modified request to security system 404 with the marked accesses associated with accesses to sensitive data and unmarked accesses associated with accesses to non-sensitive data. That is, having identified at least one access to sensitive data in the response, security system agent 410 marks, in the original request to be sent to security system 410, the access in the original request as having accessed sensitive information thereby forming a modified request.

Upon security system 404 receiving the modified request sent by security system agent 410, security system 404 recognizes the modified request as security important, due to the marked access identification. Security system 404 then processes the modified request without access to any sensitive data. That is, security system 404 parses the objects in each access using a filter that identifies markings from security system agent 410 and processes each access. Further, with regard to any marked objects, security system 404 parses any object associated an access that has been marked by security system agent 410 as being an access to sensitive data. Security system 404 extracts the object and adds the object to a list of sensitive objects 420 as an object that comprises sensitive data. Additionally, security system 404 uses the list of sensitive objects 420 as criteria for implementing security policies and/or other operations such as analytics 412, reports 414, alerts 416, or other information 418, pertaining to the accessed sensitive data and objects added to the list of sensitive objects 420. For example, security system 404 uses the identification of access to the sensitive data that is identified in the modified request to detect data access violations.

While in this example the addition of the object to the list of sensitive objects 420 is straight forward, not all objects identified as sensitive are immediately added to the list of sensitive objects 420. That is, taking the previous example a step further, two additional requests are received, the first request having an combined set of objects that includes an first object that has already been marked sensitive and a second object that is marked sensitive because it is joined with the first object and the second request having an object that matches the second object of the first request, which would is not marked sensitive by the security system agent 410. However, in the first request of the two additional requests, the second object is only identified as sensitive simply because the second object is joined with first object that was known to be sensitive, which creates a false positive on a non-sensitive object. Through, for example, machine learning techniques, rules engine applications, or the like, security system 404 identifies request objects that are false positives, such as the second object since, in the second of the two additional requests, the second object was not marked by the security system agent as being sensitive. Thus, the security system would filter out such objects that are falsely identified as being of a sensitive nature simply because the objects are joined to another object identified as sensitive. After security system 404 filters out any "false positives", security system 404 adds any remaining security important objects not already in the list of sensitive objects 420 to the list of sensitive objects 420.

Figure 5:
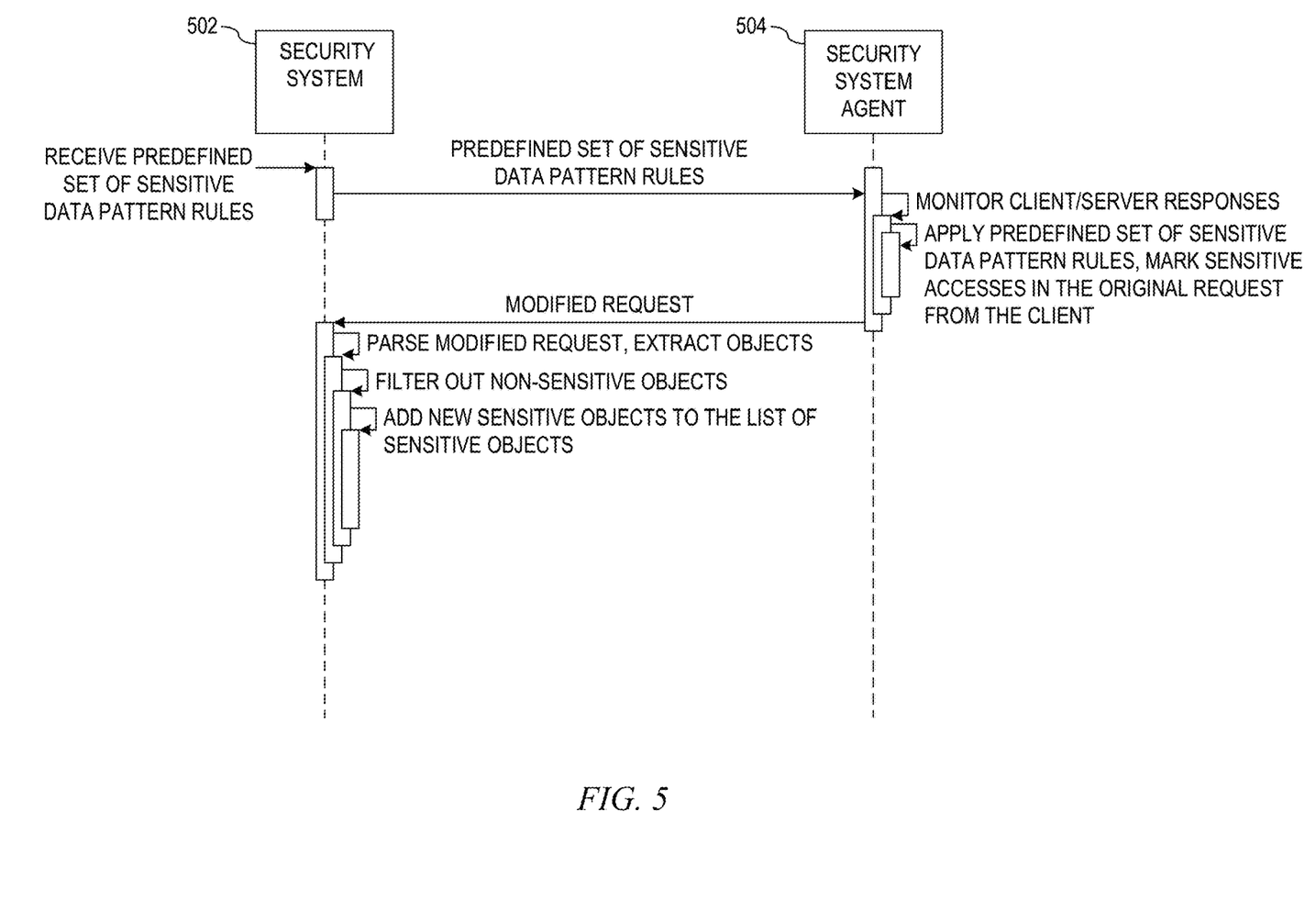
FIG. 5 provides one example of the interactions between a security system and security system agent in accordance with an illustrative embodiment.

FIG. 5 provides one example of the interactions between a security system and security system agent in accordance with an illustrative embodiment. As is illustrated, security system 502 receives a predefined set of sensitive data pattern rules. Security system 502 sends the predefined set of sensitive data patterns to security system agent 504 that resides on a server. Security system agent 504 monitors client/server responses and applies the predefined set of sensitive data pattern rules and marks sensitive accesses in the original request from the client. Security system agent 504 then sends the modified request to security system 502, the modified request including marked sensitive data accesses (if present). Security system 502 then parses the modified request and extracts all objects. Security system 502 filters out any non-sensitive objects and adds any new sensitive objects to the list of sensitive objects.

Thus, the illustrative embodiments provides mechanisms that implement pattern masking of data identified by a user as sensitive via a security system agent before sending this data for processing to the security system (appliance). The security system agent is installed on a server monitored by the security system, for example a database server, service platform, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
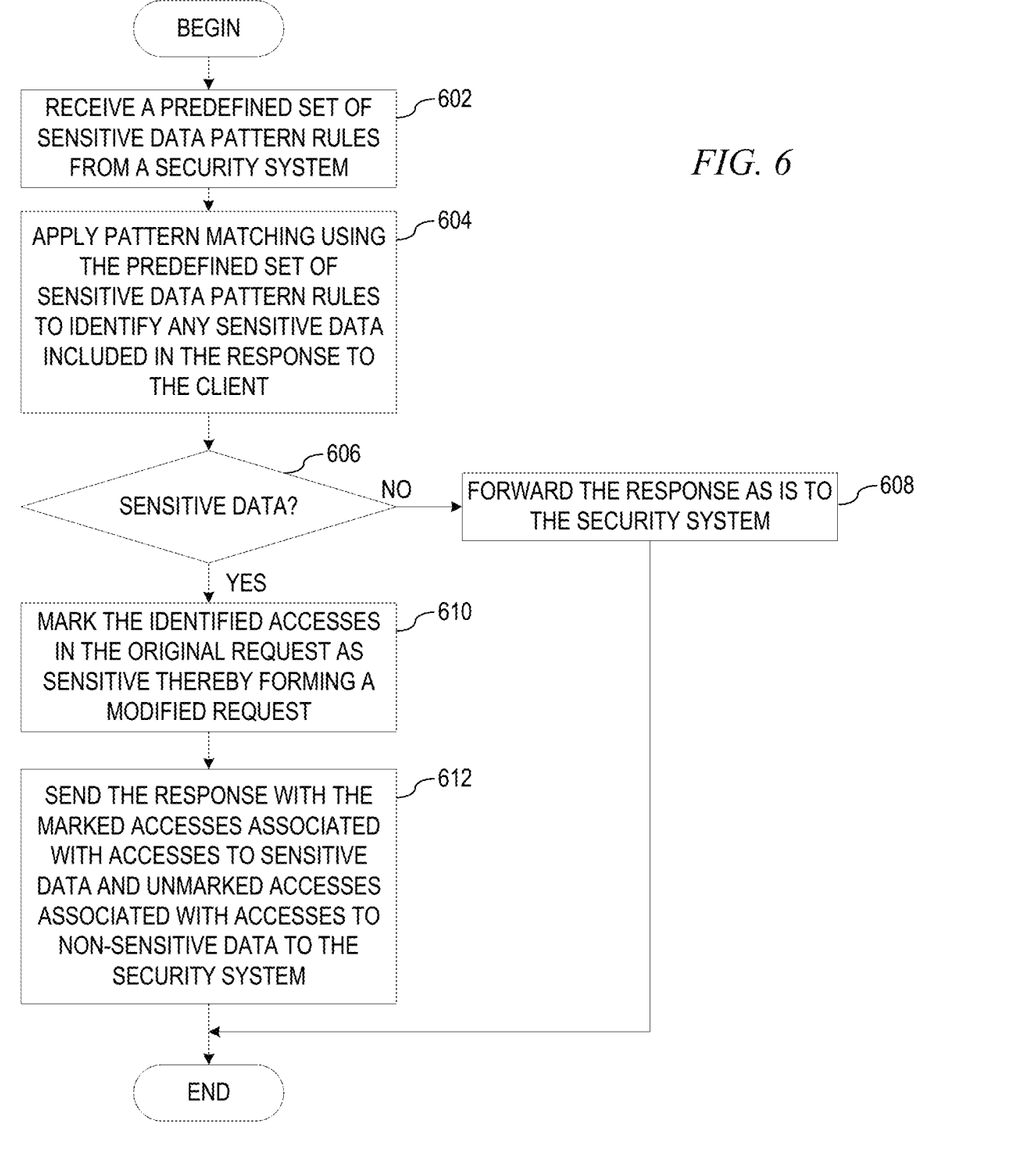
FIG. 6 depicts a flowcharts illustrating one example of the operation performed by a security system agent in monitoring and controlling data access in accordance with an illustrative embodiment.

FIG. 6 depicts a flowcharts illustrating one example of the operation performed by a security system agent in monitoring and controlling data access in accordance with an illustrative embodiment. As the operation begins, the security system agent receives a predefined set of sensitive data pattern rules from a security system (step 602). Responsive to intercepting a response that includes each access of a request and retrieved data associated with each access from a server in which the security system agent is installed, the security system agent applies pattern matching using the predefined set of sensitive data pattern rules to identify any sensitive data included in the response to the client (step 604), such as credit card numbers, social security numbers, passwords, patient records, geolocation coordinates, or the like. The security system agent determines whether any sensitive data that matches one or more of the predefined set of sensitive data pattern rules (step 606). If at step 606 the security system agent determines that there fails to be any sensitive data that matches the predefined set of sensitive data pattern rules, the security system agent forwards the response as is to the security system (step 608), with the process ending thereafter.

If step 606 the security system agent identifies sensitive data that matches one or more of the predefined set of sensitive data pattern rules, the security system agent marks the identified accesses in the original request as sensitive thereby forming a modified request (step 610). The security system agent then forwards the modified request to the security system with the marked accesses associated with accesses to sensitive data and unmarked accesses associated with accesses to non-sensitive data (step 612). The process terminates thereafter.

Figure 7:
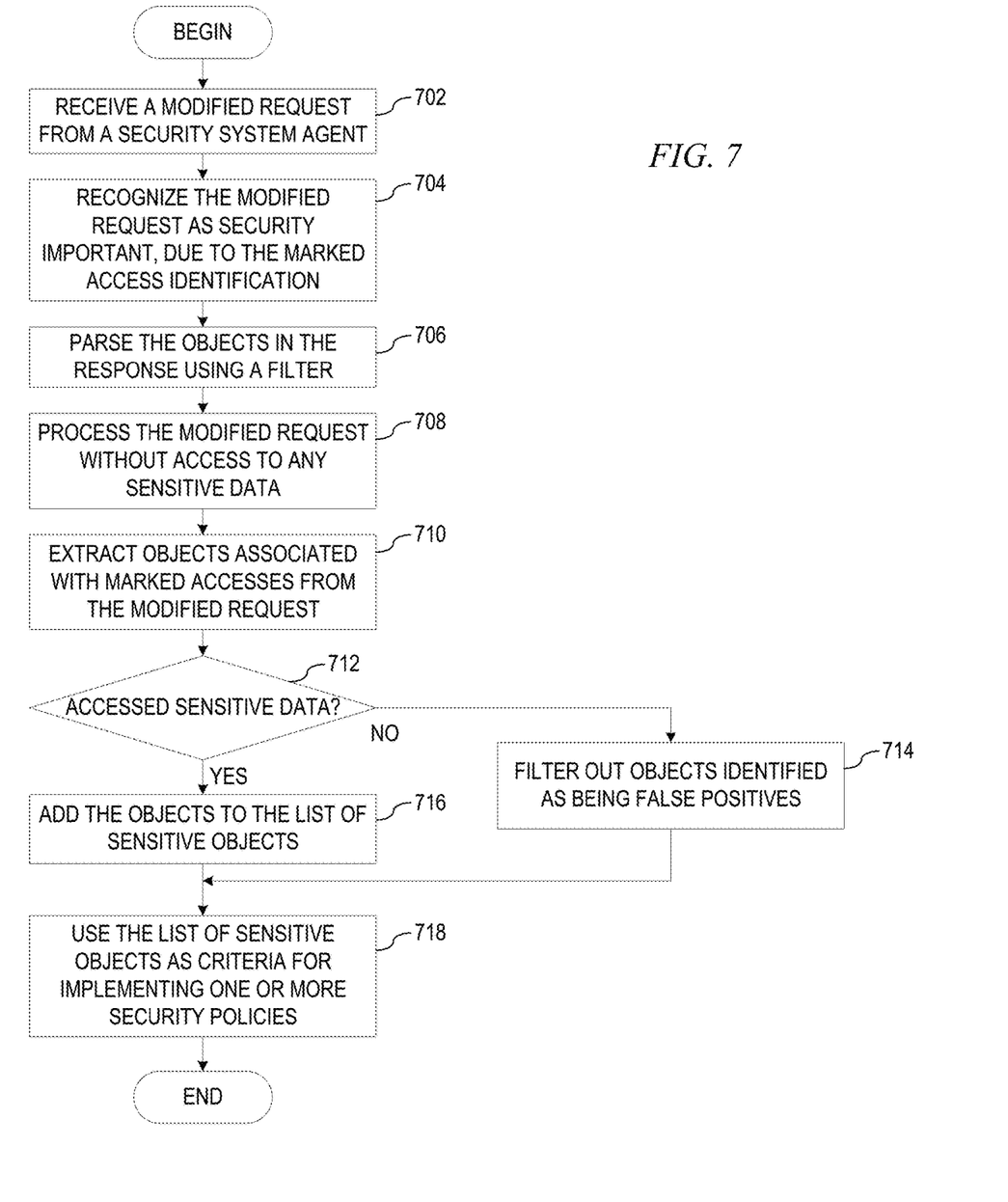
FIG. 7 depicts a flowcharts illustrating one example of the operation performed by a security system in monitoring and controlling data access in accordance with an illustrative embodiment.

FIG. 7 depicts a flowcharts illustrating one example of the operation performed by a security system in monitoring and controlling data access in accordance with an illustrative embodiment. As the operation begins, the security system receives a modified request from a security system agent (step 702). The security system recognizes the modified request as security important, due to the marked access identification (step 704). The security system processes the modified request without access to any sensitive data by parsing the objects in the each access of the response using a filter that identifies markings from the security system agent (step 706). The security system then processes the modified request (step 708).

Additionally, the security system extracts objects associated with marked accesses from the modified request (step 710). For each extracted object, the security system determines with the object actually accessed sensitive data or an object that is joined to an object that accessed sensitive data (step 712). If at step 712 the object is an object that is joined to an object that is an access to sensitive data, the security system filters out the object as being false positive (step 714). If at step 712 the object is an access to sensitive data, then the security system adds the object to the list of sensitive objects (step 716). From steps 714 and 716, the security system uses the list of sensitive objects as criteria for implementing one or more security policies (step 718), with, the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for monitoring and controlling data access, the method comprising:

responsive to intercepting a response from a server to a request for information from a client device, applying, by a security system agent installed in a server separate from a security system, pattern matching using a predefined set of sensitive data pattern rules to identify at least one sensitive data access included in the response;

determining, by the security system agent, whether the at least one sensitive data access matches one or more of the predefined set of sensitive data pattern rules;

responsive to the at least one sensitive data access matching one or more of the predefined set of sensitive data pattern rules, modifying, by the security system agent, the request from the client by marking the at least one sensitive data access as sensitive thereby forming a modified request; and processing, by the security system, the modified request, from the security system agent, without accessing the sensitive data associated with the at least one marked sensitive data access at least by:

extracting objects associated with accesses specified in the modified request;

determining whether at least one object in the extracted objects is a sensitive object because the at least one object is joined to another object that accesses sensitive data;

filtering out the at least one object as a false positive in response to a determination that the at least one object is joined to another object that accesses sensitive data; and adding any remaining objects, that were not filtered out, to a list of sensitive objects.

2. The method of claim 1, wherein the predefined set of sensitive data pattern rules are received from the security system and wherein, initially, the predefined set of sensitive data pattern rules is identified by a user of the client device.

3. The method of claim 1, further comprising:

using, by the security system, the list of sensitive objects as criteria for implementing one or more security policies.

4. The method of claim 1, wherein the at least one sensitive data access is an access to one or more of credit card numbers, social security numbers, passwords, patient records, or geolocation coordinates.

5. The method of claim 1, further comprising:

responsive to sending the modified request with the at least one marked sensitive data access to the security system, allowing by the security system agent, the response, including retrieved data associated with each access to be returned to the client.

6. A computer program product comprising a computer readable storage medium having a computer readable program for monitoring and controlling data access stored therein, wherein the computer readable program, when executed on a device security system agent installed in a server separate from a security system, causes the computing device to:

responsive to intercepting a response from a server to a request for information from a client device, apply pattern matching using a predefined set of sensitive data pattern rules to identify at least one sensitive data access included in the response;

determine whether the at least one sensitive data access matches one or more of the predefined set of sensitive data pattern rules;

responsive to the at least one sensitive data access matching one or more of the predefined set of sensitive data pattern rules, modify the request from the client by marking the at least one sensitive data access as sensitive thereby forming a modified request; and process, by the security system, the modified request, from the security system agent, without accessing the sensitive data associated with the at least one marked sensitive data access at least by:

extracting objects associated with accesses specified in the modified request;

determining whether at least one object in the extracted objects is a sensitive object because the at least one object is joined to another object that accesses sensitive data;

filtering out the at least one object as a false positive in response to a determination that the at least one object is joined to another object that accesses sensitive data; and adding any remaining objects, that were not filtered out, to a list of sensitive objects.

7. The computer program product of claim 6, wherein the predefined set of sensitive data pattern rules are received from the security system and wherein, initially, the predefined set of sensitive data pattern rules is identified by a user of the client device.

8. The computer program product of claim 6, wherein the security system further operates to:
use the list of sensitive objects as criteria for implementing one or more security policies.

9. The computer program product of claim 6, wherein the at least one sensitive data access is an access to one or more of credit card numbers, social security, numbers, passwords, patient records, or geolocation coordinates.

10. The computer program product of claim 6, wherein the computer readable program further causes the computing device to:
responsive to sending the modified request with the at least one marked sensitive data access to the security system, allow the response including retrieved data associated with each access to be returned to the client.

11. A security system agent apparatus installed in a server separate from a security system for monitoring and controlling data access comprising:
a processor; and
a memory coupled to the processor, wherein the memory comprises instructions which, when executed by the processor, cause the processor to:
responsive to intercepting a response from a server to a request for information from a client device, apply pattern matching using a predefined set of sensitive data pattern rules to identify at least one sensitive data access included in the response;

determine whether the at least one sensitive data access matches one or more of the predefined set of sensitive data pattern rules;

responsive to the at least one sensitive data access matching one or more of the predefined set of sensitive data pattern rules, modifies the request from the client by marking the at least one sensitive data access as sensitive thereby forming a modified request; and process, by the security system, the modified request, from the security system agent, without accessing the sensitive data associated with the at least one marked sensitive data access at least by:

extracting objects associated with accesses specified in the modified request;

determining whether at least one object in the extracted objects is a sensitive object because the at least one object is joined to another object that accesses sensitive data;

filtering out the at least one object as a false positive in response to a determination that the at least one object is joined to another object that accesses sensitive data; and adding any remaining objects, that were not filtered out, to a list of sensitive, objects.

12. The security system agent apparatus of claim 11, wherein the predefined set of sensitive data pattern rules are received from the security system and wherein, initially, the predefined set of sensitive data pattern rules is identified by a user of the client device.

13. The security system agent apparatus of claim 11, wherein the security system further operates to:
use the list of sensitive objects as criteria for implementing one or more security policies.

14. The security system agent apparatus of claim 11, wherein the instructions further cause the security system agent apparatus to:
responsive to sending the modified request with the at least one marked sensitive data access to the security system, allow the response including retrieved data associated with each access to be returned to the client.

\* \* \* \* \*